(No Model.)

J. BAYER & E. PUCHTA.
MANUFACTURE OF TILES.

No. 338,465. Patented Mar. 23, 1886.

WITNESSES:

INVENTOR:

UNITED STATES PATENT OFFICE.

JOSEPH BAYER AND EMIL PUCHTA, OF WASHINGTON, MISSOURI.

MANUFACTURE OF TILES.

SPECIFICATION forming part of Letters Patent No. 338,465, dated March 23, 1886.

Application filed September 25, 1885. Serial No. 178,154. (No model.)

*To all whom it may concern:*

Be it known that we, JOSEPH BAYER and EMIL PUCHTA, both of Washington, in the county of Franklin and State of Missouri, have invented a new and useful Improvement in the Manufacture of Tiles, of which the following is a full, clear, and exact description.

This invention has for its object the production of tiles for pavement and other purposes which shall be indestructible from fire, ice, snow, or rain, will not absorb water, and when used in a pavement will afford greater protection against slipping or falling, and which shall have increased hardness and durability. To these ends the clay of which the tile is composed is washed free from all foreign or deleterious substances, substantially as hereinafter described, and whereby we produce a tile purified from foreign substances.

Reference is to be had to the accompanying drawings, forming a part of this specification, in which similar letters of reference indicate corresponding parts in both the figures.

Figure 1:
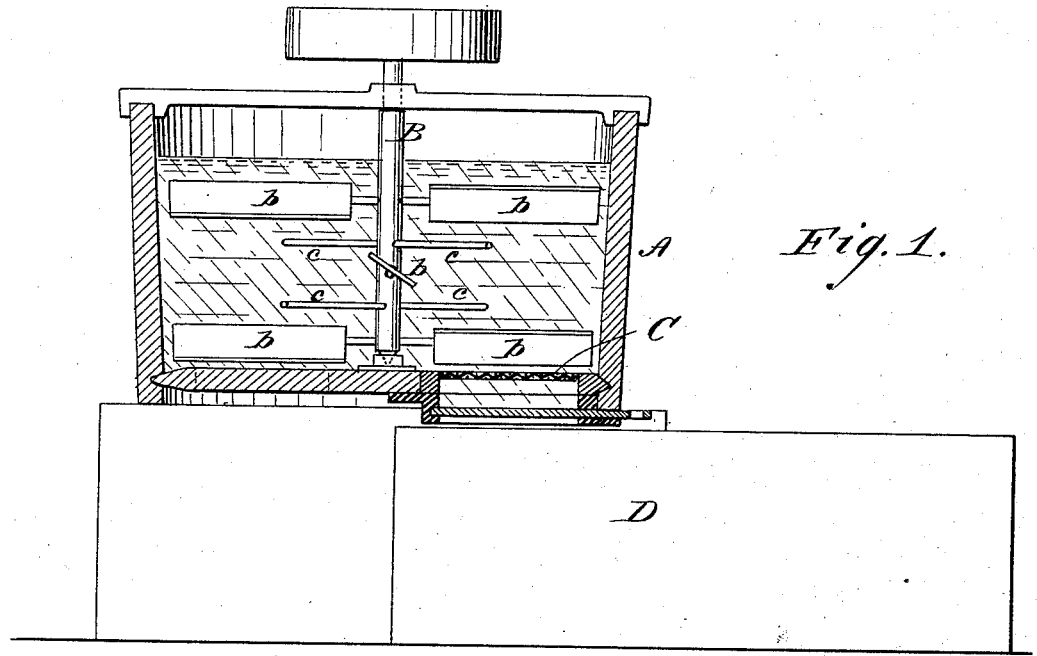
Figure 2:
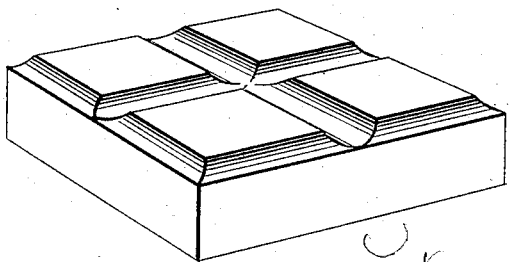

Figure 1 represents a partly-sectional elevation of an apparatus, in part, which may be used in manufacturing our improved tile; and Fig. 2, a view in perspective of the tile.

The apparatus of course may be greatly varied; but that shown in the drawings will suffice to explain how our improved tile is or may be made. Thus we first take the clay in its ordinary or only partially-prepared condition and put it into a tub, A, provided with a series of horizontally-revolving shovels, $b$, and teeth $c$, carried by a vertical shaft, B, and constituting an agitator or mixer. Water is also introduced into the tub in the proportion of one part to two parts of clay, or in such other proportions as in the operation of the stirrer or mixer will cause the washed clay to pass through a No. 10 or other sized sieve, C, leaving all the foreign and deleterious solid substances introduced along with the clay, and which cannot pass through the sieve, behind, to be afterward removed as useless. The clay thus washed and purified, which alone is passed through the sieve, is transferred to a reservoir, D, where it is dried, and after it has acquired its requisite stiffness it is ground and pressed into molds or forms. When hard enough it can be pressed into any required form or mold—as, for instance, to produce the tile shown in Fig. 2, or any other shaped tile, which is finished by burning or heating, as usual.

The superiority of the tile in the several respects hereinbefore mentioned in describing the object of the invention, and which is attained by the invention, is dependent upon the washing of the clay before drying, grinding, and pressing it into form to make the tile, as by this process all impure solid matters are separated from the clay, and at the same time the clay has a toughness given it which considerably adds to the hardness and strength of the tile.

The main advantage from this method or process is, that the tile, while undergoing burning, heating, or baking, receives an equal hardness and stiffness throughout, and which cannot be attained by the ordinary method practiced by "squashing" the clay.

Different kinds of clay may be mixed to give different colors without impairing the hardness of the tile. The process, however, which we have described is necessary to produce the improved tile.

Having thus fully described our invention, we claim as new and desire to secure by Letters Patent—

The process herein described of making tiles, which consists in first washing the clay by mixing it with water, stirring the same, passing the washed clay through a sieve, drying the washed or purified clay, and subsequently grinding it and pressing it into form, and finally baking the same, as specified.

JOSEPH BAYER.
EMIL PUCHTA.

Witnesses:
EDWARD F. JASPER,
WILLIAM BRIX.